United States Patent
Palenius et al.

(10) Patent No.: US 11,622,329 B2
(45) Date of Patent: *Apr. 4, 2023

(54) METHODS OF UE POWER SAVING WITH MULTIPLE RECEIVERS

(71) Applicant: Telefonaktiebolaget LM Ericsson (publ), Stockholm (SE)

(72) Inventors: Torgny Palenius, Barsebäck (SE); Joakim Axmon, Limhamn (SE); Christopher Callender, Kinross (GB); Maomao Chen Larsson, Lund (SE); Muhammad Kazmi, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 133 days.

This patent is subject to a terminal disclaimer.

(21) Appl. No.: 17/231,520

(22) Filed: Apr. 15, 2021

(65) Prior Publication Data

US 2021/0235379 A1    Jul. 29, 2021

Related U.S. Application Data

(63) Continuation of application No. 15/094,401, filed on Apr. 8, 2016, now Pat. No. 10,999,794.

(Continued)

(51) Int. Cl.
*H04W 52/02* (2009.01)
*H04B 7/0426* (2017.01)
(Continued)

(52) U.S. Cl.
CPC ...... *H04W 52/0216* (2013.01); *H04B 7/0426* (2013.01); *H04B 7/0817* (2013.01);
(Continued)

(58) Field of Classification Search
None
See application file for complete search history.

(56) References Cited

U.S. PATENT DOCUMENTS 6,678,508 B1 *  1/2004  Koilpillai ......... H04W 52/0245
                                                 455/132
8,149,746 B2 *  4/2012  Demirhan ............... H04Q 9/00
                                                 370/335

(Continued)

FOREIGN PATENT DOCUMENTS

WO   2015112072 A1   7/2015

OTHER PUBLICATIONS

Third Generation Partnership Program. "New Work Item: LTE DL 4 Rx antenna ports." 3GPP TSG RAN Meeting #67; Shanghai, China; Mar. 9-12, 2015; pp. 1-8.

(Continued)

*Primary Examiner* — Christopher T Wyllie
(74) *Attorney, Agent, or Firm* — Coats & Bennett, PLLC

(57) ABSTRACT

A network node in a wireless communication network generates configuration information that configures an extent to which a wireless communication device autonomously adapts a number of different receiver components that the wireless communication device uses under different conditions at the wireless communication device. In some examples, the different conditions may be associated with correlation of propagation channels received at the wireless communication device. The network node transmits the configuration information to the device. Correspondingly, the device autonomously adapts the number of different receiver components that the wireless communication device uses in accordance with the configuration information.

19 Claims, 7 Drawing Sheets

Related U.S. Application Data

(60) Provisional application No. 62/145,876, filed on Apr. 10, 2015.

(51) Int. Cl.
*H04B 7/08* (2006.01)
*H04B 1/16* (2006.01)

(52) U.S. Cl.
CPC ......... *H04B 7/0837* (2013.01); *H04B 7/0874* (2013.01); *H04W 52/0274* (2013.01); *H04B 1/1607* (2013.01); *Y02D 30/70* (2020.08)

(56) References Cited

U.S. PATENT DOCUMENTS

| | | | | |
|---|---|---|---|---|
| 8,873,662 | B2 | 10/2014 | Sesia et al. | |
| 8,873,665 | B2* | 10/2014 | Clevorn | H04B 7/0874 375/267 |
| 2004/0219959 | A1* | 11/2004 | Khayrallah | H04B 7/0877 455/574 |
| 2005/0135403 | A1* | 6/2005 | Ketchum | H04L 69/32 370/437 |
| 2005/0197079 | A1* | 9/2005 | Banister | H04W 52/42 455/135 |
| 2005/0197080 | A1* | 9/2005 | Ulupinar | H04W 52/42 455/67.7 |
| 2006/0240827 | A1* | 10/2006 | Dunn | H04B 7/0617 455/436 |
| 2007/0173303 | A1* | 7/2007 | Viorel | H04B 7/0874 455/562.1 |
| 2008/0031190 | A1* | 2/2008 | Bae | H04L 5/023 370/329 |
| 2008/0049653 | A1* | 2/2008 | Demirhan | H04Q 9/00 370/311 |
| 2008/0064353 | A1* | 3/2008 | McBeath | H04B 7/0619 455/187.1 |
| 2008/0107047 | A1* | 5/2008 | Olfat | H04W 16/02 370/208 |
| 2009/0042529 | A1* | 2/2009 | Lindenmeier | H04L 1/04 455/277.2 |
| 2009/0176463 | A1* | 7/2009 | Raaf | H04B 7/0689 455/101 |
| 2009/0180413 | A1* | 7/2009 | Sutton | H04W 52/0225 375/316 |
| 2010/0225547 | A1* | 9/2010 | Lan | H01Q 1/3283 343/861 |
| 2011/0201295 | A1 | 8/2011 | Ma | |
| 2012/0057621 | A1* | 3/2012 | Hong | H04W 52/0264 375/228 |
| 2012/0093064 | A1* | 4/2012 | Horiuchi | H04W 72/1205 370/315 |
| 2012/0120998 | A1 | 5/2012 | Fakhrai et al. | |
| 2012/0165063 | A1* | 6/2012 | Scalia | H04B 7/0608 455/517 |
| 2012/0195252 | A1* | 8/2012 | Suga | H04B 7/15528 370/315 |
| 2013/0028218 | A1* | 1/2013 | Chun | H04L 5/0023 370/329 |
| 2013/0100875 | A1* | 4/2013 | Chun | H04L 25/03904 370/312 |
| 2013/0102316 | A1* | 4/2013 | Ngai | H04B 7/0837 455/442 |
| 2014/0029484 | A1* | 1/2014 | Choi | H04L 5/1469 370/280 |
| 2014/0086209 | A1* | 3/2014 | Su | H04W 76/19 370/331 |
| 2014/0098694 | A1* | 4/2014 | Damji | H04W 52/0229 370/252 |
| 2014/0146907 | A1* | 5/2014 | Kim | H04W 72/042 375/267 |
| 2014/0269373 | A1* | 9/2014 | Nimmala | H04W 24/02 370/252 |
| 2014/0293874 | A1* | 10/2014 | Oh | H04B 7/0689 370/328 |
| 2014/0301297 | A1* | 10/2014 | Geirhofer | H04L 5/0053 370/329 |
| 2015/0063293 | A1* | 3/2015 | Lee | H04L 5/0048 370/330 |
| 2015/0072627 | A1* | 3/2015 | Balasubramanian | H04B 15/02 455/77 |
| 2015/0131461 | A1 | 5/2015 | Ramkumar | |
| 2015/0282057 | A1* | 10/2015 | Li | H04B 7/0871 455/552.1 |
| 2015/0282154 | A1* | 10/2015 | Yavuz | H04W 52/0277 370/311 |
| 2015/0289238 | A1* | 10/2015 | Ji | H04B 7/0456 370/329 |
| 2016/0127030 | A1* | 5/2016 | Kim | H04L 5/0023 370/329 |
| 2016/0249350 | A1* | 8/2016 | Koutsimanis | H04W 16/14 |

OTHER PUBLICATIONS

3rd Generation Partnership Project, "3rd Generation Partnership Project; Technical Specification Group Radio Access Network; Evolved Universal Terrestrial Radio Access (E-UTRA); User Equipment (UE) radio transmission and reception (Release 12)", Technical Specification, 3GPP TS 36.101 V12.11.0, Mar. 1, 2016, pp. 1-769, 3GPP, France.

3rd Generation Partnership Project, "3rd Generation Partnership Project; Technical Specification Group Radio Access Network; Physical layer procedures (FDD) (Release 12)", Technical Specification, 3GPP TS 25.214 V12.3.0, Jun. 1, 2015, pp. 1-137, 3GPP, France.

3rd Generation Partnership Project, "3rd Generation Partnership Project; Technical Specification Group Radio Access Network; Evolved Universal Terrestrial Radio Access (E-UTRA); Physical layer procedures (Release 12)", Technical Specification, 3GPP TS 36.213 V12.9.1, Mar. 1, 2016, pp. 1-241, 3GPP, France.

3rd Generation Partnership Project, "3rd Generation Partnership Project; Technical Specification Group Radio Access Network; Evolved Universal Terrestrial Radio Access (E-UTRA); Requirements for support of radio resource management (Release 12)", Technical Specification, 3GPP TS 36.133 V12.11.0, Mar. 1, 2016, pp. 1-1484, 3GPP, France.

3rd Generation Partnership Project, "3rd Generation Partnership Project; Technical Specification Group Radio Access Network; Evolved Universal Terrestrial Radio Access (E-UTRA); Requirements for support of radio resource management (Release 12)", Technical Specification, 3GPP TS 36.133 V12.7.0, Mar. 1, 2015, pp. 1-1014, 3GPP, France.

3rd Generation Partnership Project, "3rd Generation Partnership Project; Technical Specification Group Radio Access Network; Evolved Universal Terrestrial Radio Access (E-UTRA); User Equipment (UE) radio transmission and reception (Release 12)", Technical Specification, 3GPP TS 36.101 V12.7.0, Mar. 1, 2015, pp. 1-659, 3GPP, France.

3rd Generation Partnership Project, "3rd Generation Partnership Project; Technical Specification Group Radio Access Network; Physical layer procedures (FDD) (Release 12)", Technical Specification, 3GPP TS 25.214 V12.2.0, Mar. 1, 2015, pp. 1-137, 3GPP, France.

3rd Generation Partnership Project, "3rd Generation Partnership Project; Technical Specification Group Radio Access Network; Evolved Universal Terrestrial Radio Access (E-UTRA); Physical layer procedures (Release 12)", Technical Specification, 3GPP TS 36.213 V12.5.0, Mar. 1, 2015, pp. 1-239, 3GPP, France.

Ericsson, "New Work Item: LTE DL 4 Rx antenna ports", 3GPP TSG RAN Meeting #67, Shanghai, China, Mar. 9, 2015, pp. 1-9, RP-150427 (revision of RP-150142), 3GPP.

Ericsson, "New Work Item: LTE DL 4 Rx antenna ports", 3GPP TSG RAN Meeting #67, Shanghai, China, Mar. 9, 2015, pp. 1-9, RP-150427 (revision of RP-150142), track changes version, 3GPP.

(56) References Cited

OTHER PUBLICATIONS

Ericsson, "New Study Item: Study on LTE DL 4 Rx antenna ports", 3GPP TSG RAN Meeting #66, Maui, Hawaii, Dec. 8, 2014, pp. 1-7, RP-142299 (revision of RP-141870), 3GPP.
Ericsson, "Antenna configuration and correlation for 4Rx", 3GPP TSG-RAN WG4 Meeting #75, Fukoka, Japan, May 19, 2015, pp. 1-7, R4-153100, 3GPP.
Ericsson, "Performance requirements of PDSCH with 4 Rx", 3GPP TSG-RAN WG4 Meeting # 75, Fukuoka, Japan, May 25, 2015, pp. 1-27, R4-153102, 3GPP.
Ericsson, "General scope of 4Rx feature on UE performance aspect", 3GPP TSG-RAN WG4 Meeting #74bis, Rio, Brazil, Apr. 20, 2015, pp. 1-8, R4-151972, 3GPP.

\* cited by examiner

100

```
GENERATE CONFIGURATION INFORMATION THAT CONFIGURES
AN EXTENT TO WHICH A WIRELESS COMMUNICATION DEVICE
AUTONOMOUSLY ADAPTS THE NUMBER OF RECEIVER
COMPONENTS THAT THE WIRELESS COMMUNICATION DEVICE
USES UNDER DIFFERENT CONDITIONS AT THE WIRELESS
COMMUNICATION DEVICE, SUBJECT TO MINIMUM RECEIVER
COMPONENT REQUIREMENTS RESPECTIVELY SPECIFIED FOR
THE DIFFERENT CONDITIONS, WHEREIN THE DIFFERENT
CONDITIONS ARE ASSOCIATED WITH PROPAGATION CHANNELS
RECEIVED AT THE WIRELESS COMMUNICATION DEVICE
102
```

```
SEND THE CONFIGURATION INFORMATION
FROM THE NETWORK NODE TO THE WIRELESS COMMUNICATION
DEVICE
104
```

RECEIVE, FROM A NETWORK NODE IN A WIRELESS COMMUNICATION NETWORK, CONFIGURATION INFORMATION THAT CONFIGURES AN EXTENT TO WHICH THE WIRELESS COMMUNICATION DEVICE AUTONOMOUSLY ADAPTS THE NUMBER OF RECEIVER COMPONENTS THAT THE DEVICE USES UNDER DIFFERENT CONDITIONS AT THE WIRELESS COMMUNICATION DEVICE, SUBJECT TO MINIMUM RECEIVER COMPONENT REQUIREMENTS RESPECTIVELY SPECIFIED FOR THE DIFFERENT CONDITIONS, WHEREIN THE DIFFERENT CONDITIONS ARE ASSOCIATED WITH PROPAGATION CHANNELS RECEIVED AT THE WIRELESS COMMUNICATION DEVICE
202

AUTONOMOUSLY ADAPT THE NUMBER OF RECEIVER COMPONENTS THAT THE WIRELESS COMMUNICATION DEVICE USES IN ACCORDANCE WITH THE CONFIGURATION INFORMATION
204

*FIG. 2*

METHODS OF UE POWER SAVING WITH MULTIPLE RECEIVERS

RELATED APPLICATIONS

This application is a continuation of prior U.S. application Ser. No. 15/094,401, filed 8 Apr. 2016, which claims the benefit of U.S. Provisional Application No. 62/145,876, filed 10 Apr. 2015, the entire disclosure of each being hereby incorporated by reference herein.

TECHNICAL FIELD

The invention relates to methods and devices for reducing power consumption by a wireless communication device.

BACKGROUND

In the Third Generation Partnership Project (3GPP), and particularly in the RAN4 group, the standardization of performance requirements for terminals supporting Long-Term Evolution (LTE) with four receivers is ongoing. Two receivers are mandatory in a UE (except for LTE category 0), and now the performance of a UE with four receivers will be specified. In the future, UE requirements for more than four receive antennas may also be introduced (e.g., for UEs supporting eight receivers).

Multiple-Input and Multiple-Output (MIMO) is a technology used e.g. in LTE where several data streams, or layers, can be received simultaneously and thereby increase the data throughput that can be received. MIMO is also more generally known as multi-antenna or multiple-antenna technology. The number of layers that can be supported in a certain situation depends on the independence of the fading of the different propagation channels between all the transmitter antennas in the base-station and the receiver antennas in the terminal. The correlation of the propagation channels give the number of streams or layers that can be supported in this situation. The terminal reports to the network node (e.g., serving base station) the number of layers that can be supported using the rank indicator (RI). A terminal needs at least four receivers to be able to support MIMO with four layers.

The receiver performance of one or two data streams can alternatively by improved by using several antennas to mitigate fading due to spatial diversity. Thereby the throughput can be improved considerably when the propagation channel is fading.

Also the detection performance (e.g. time or delay to detect) for searching cells which have not been detected and the measurement performance of already detected cells is improved. The search for neighbor cells as well as measurements of neighbor cells is always done, in idle mode as well as in connected mode, and can thereby always be improved by using more receivers.

The performance of a UE is improved by using more receivers; the improvement depends on the situation and environment. In case MIMO is used and the propagation channel can support more than one layer then the time to download an amount of data is substantially shortened, especially if three or four layers can be used. Also the UE can find cells earlier and can thereby avoid dropped connection when it is moving, resulting in improved user experience and better usage of the system capacity since interruptions and signaling overhead caused by radio resource re-establishment procedures in many cases can be avoided.

Using more receivers, however, will substantially increase the power consumption. In case of idle mode the power consumption from the radio receivers are a large proportion of the total consumed power and the number of receivers will affect the standby time of the UE. Also in connected mode the number radio receivers affects the power consumption and thereby the talk time of the terminal. For connected mode, it is particularly important to save power when DRX is ongoing.

SUMMARY

One or more embodiments herein include a network node that configures the extent to which a wireless communication device autonomously adapts the number of receiver components that the device uses. In this regard, a receiver component as used herein is a receive antenna, a receiver circuit, and/or a receiver chain that includes a receive antenna and a receiver circuit. This advantageously enables the network node to, for example, limit the extent to which the device performs autonomous receiver component adaptation when system capacity concerns suggest that the device should use a higher number of receiver components, but to otherwise allow the device to freely perform autonomous receiver component adaptation as needed to address battery conservation concerns at the device.

In more detail, some embodiments include a method implemented by a network node in a wireless communication network. The method comprises generating configuration information that configures an extent to which a wireless communication device autonomously adapts the number of receiver components that the device uses under different conditions at the device, subject to minimum receiver component requirements respectively specified for the different conditions. The method further comprises sending the configuration information from the network node to the device.

Other embodiments correspondingly include a method implemented by a wireless communication device. The method includes receiving, from a network node in a wireless communication network, configuration information that configures an extent to which the device autonomously adapts the number of receiver components that the device uses under different conditions at the device, subject to minimum receiver component requirements respectively specified for the different conditions. The method also includes autonomously adapting the number of receiver components that the device uses in accordance with the configuration information.

Still other embodiments include a wireless transceiver station arranged to operate in a cellular communication network. The transceiver station is arranged to receive, from a network node of the cellular communication network, a configuration for receiver adaptation comprising a minimum requirement for multiple receiver chains. Each receiver chain in this case comprises an antenna and a receiver circuit. The transceiver station is further arranged to determine conditions of the transceiver station. These conditions comprises any of present internal performance of the transceiver station, present channel conditions of one or more channels to respective network nodes of the cellular communication network, and imminent communication mode of the transceiver station, or any combination thereof. The transceiver station is also arranged to assign a number of receiver chains to use based on the received configuration and the determined conditions.

Further embodiments include a network node arranged to operate in a cellular communication network. The network node is arranged to determine conditions for a transceiver station. These conditions comprises any of stored internal performance of the transceiver station, estimated channel conditions of a channel to the transceiver station, and a communication mode of the transceiver station, or any combination thereof. The network node is also arranged to determine a configuration for the transceiver station comprising a minimum requirement for multiple receiver chains, based on the determined conditions and scheduled communication for transceiver stations associated with the network node. Each receiver chain in this case comprises an antenna and a receiver circuit. The network node is further arranged to transmit the determined configuration to the transceiver station.

BRIEF DESCRIPTION OF DRAWINGS

FIG. 1 illustrates a method implemented by a network node.

FIG. 2 illustrates a corresponding method implemented by a wireless communication device.

DETAILED DESCRIPTION

Figure 3:
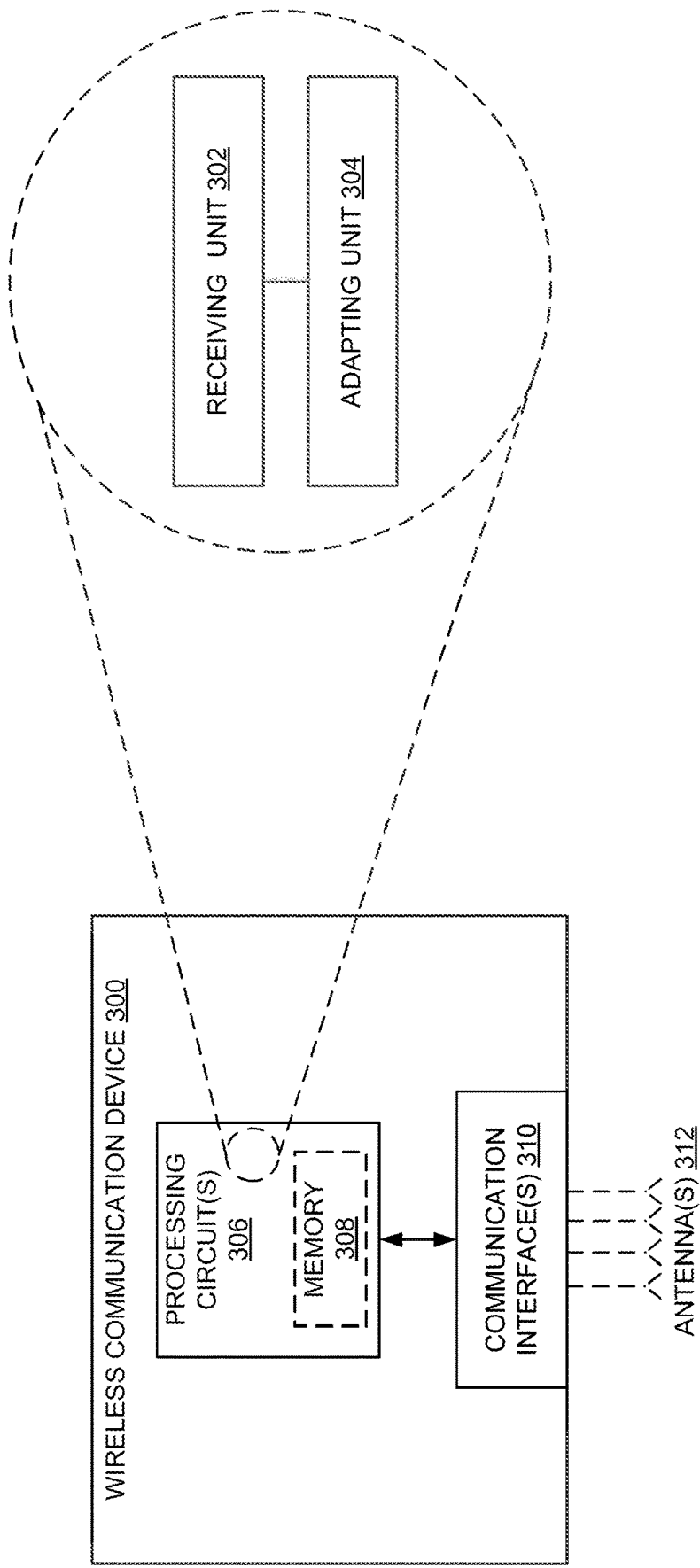
FIG. 3 illustrates details of an example wireless communication device according to one or more embodiments.

A wireless communication device according to embodiments presented herein includes multiple receiver components. For purposes of the present disclosure, a receiver component may be a receive antenna, a receiver circuit, and/or a receiver chain that includes a receive antenna and a receiver circuit. The device is capable of dynamically adapting the number of receiver components that the device uses, such as by activating or deactivating each receiver component. According to one or more embodiments herein, though, a network node in a wireless communication network configures the extent to which the device performs this receiver component adaptation.

FIG. 1 illustrates a method 100 implemented by a network node (e.g. network node 400 of FIG. 4, below) in this regard. The method 100 comprises, at block 102, generating configuration information that configures an extent to which a wireless communication device autonomously adapts the number of receiver components that the device uses under different conditions at the device. In some examples, the different conditions may be defined in the configuration, and as such, may include different possible defined conditions, such as one or more different possible defined propagation channel conditions. Furthermore, the adaptation at the wireless communication device may be subject to minimum receiver component requirements respectively specified for the different conditions. Furthermore, the different conditions at the device may be associated with propagation channels received at the wireless communication device.

In at least some embodiments, the network node generates the configuration information based on capacity needs of the network. The network node may, for example, limit the extent to which the device performs autonomous receiver component adaptation when system capacity concerns suggest that the device should use a higher number of receiver components. In one or more embodiments in this regard, the network node in implementing the method generates the configuration information to adjust the extent to which receiver component adaptation by the device is allowed, depending on capacity needs of the network. The network node does so in order to allow receiver component adaptation by the device to a greater extent when capacity needs of the network are lower and to a lesser extent when capacity needs of the network are higher.

Alternatively or additionally, the network node in implementing the method adjusts the extent to which receiver component adaptation by the device is allowed by adjusting one or more of: (1) the number of defined conditions under which receiver component adaptation is allowed; (2) the minimum receiver component requirements for one of the defined conditions; (3) a value of a parameter that governs whether or not one of the defined conditions is deemed to have been met; and (4) a length of a time period between which the device adapts the number of receiver components that the device uses. The network node may signal these adjustments to the device via the configuration information.

In this regard, the configuration information in at least some embodiments indicates, for each of one or more different conditions at the device, whether the device is allowed to autonomously adapt the number of receiver components that the device uses under that condition. For example, in some embodiments the configuration information indicates that the device is allowed to autonomously adapt the number of receiver components that the device uses under a given condition at the device by indicating an identifier that identifies the given condition in a preconfigured list at the device which lists the one or more different conditions. In one such embodiment, the network node effectively "disables" or "enables" the device's ability to adapt its receiver components under certain scenarios. The network node may do so in some instances without having knowledge of the actual or current conditions at the device.

A condition, in some embodiments, is defined in the sense that it is unambiguously described in terms of one or more parameters which are measurable by the device. For example, the conditions may be associated with the device's internal performance (e.g., temperature, battery charging status, memory and/or processor usage), the channel conditions at the device (e.g., signal quality, multipath conditions, radio environment, antenna function, correlation between receiver components, associated propagation channels, and/or signals received thereon), the device's communication mode (e.g., data rate requirement, transmission mode, DRX cycle), or any combination thereof. Alternatively or additionally, the different conditions at the device may include one or more of: (1) whether a battery of the device is connected to a charging source; (2) whether a temperature of internal circuitry of the device exceeds a threshold; (3) whether a metric reflecting wireless communication coverage exceeds a threshold; (4) whether a velocity or speed of the device exceeds a threshold; (5) in which transmission mode the device is operating; (6) whether a rate and/or volume of data to be sent to the device exceeds a threshold; (7) whether a discontinuous reception cycle length exceeds a threshold; (8) whether a metric reflecting propagation conditions or a radio environment at the device exceeds a threshold; (9) whether one or more antennas of the device are shadowed, faded, or malfunctioning; (10) whether memory usage of the device exceeds a threshold; (11) whether processor usage of the device exceeds a threshold; (12) whether a metric reflecting radio link monitoring performance is exceeds a threshold; and (13) whether a number of cells already detected by the device exceeds a threshold.

In some embodiments, the conditions may be associated with propagation channels received at the wireless communication device. For instance, the conditions may be associated with correlation of the propagation channels received at the wireless communication device. Accordingly, in some embodiments, the different conditions may be associated with different degrees of correlation between different propagation channels received at the wireless communication device. Furthermore, these different degrees of correlation may be defined by one or more correlation thresholds indicated by the configuration information.

Alternatively or additionally, the configuration information in some embodiments respectively specifies the minimum receiver component requirements for the different conditions. In some additional or alternative embodiments, the configuration information indicates, for each of one or more of the different conditions, a value of each of one or more parameters that govern whether or not the condition is deemed to have been met. The one or more parameters in this regard may be one or more thresholds (e.g., a signal quality threshold, a velocity threshold, an internal temperature threshold) that the device compares measurements to for determining whether the condition is satisfied. Furthermore, the configuration information may indicate a length of a time period between which the device is allowed or required to adapt the number of receiver components that the device uses.

Regardless of the nature of the configuration information or the particular conditions included in the configuration information, the method 100 further comprises sending the configuration information from the network node to the device at block 104. In this regard, the wireless communication device may receive the configuration information and may adapt a number of receiver components used by the wireless communication device according to the configuration information.

In any of the above embodiments, the device may be configured to send certain feedback to the network node. In one embodiment, this feedback indicates whether one or more of the different conditions at the device are currently met. The network node in at least some embodiments is configured to generate the configuration information based on this feedback. In another embodiment, the feedback indicates the number of receiver components that the device actually used under one or more of the different conditions. In this case, the network node may perform one or more tasks or operations based on the feedback, such as revising or tuning the configuration information.

FIG. 2 illustrates a corresponding method 200 implemented by a wireless communication device. At block 202, the method 200 includes receiving, from a network node in a wireless communication network, configuration information that configures an extent to which the wireless communication device autonomously adapts the number of receiver components that the wireless communication device uses under different conditions at the device. In an aspect, the adaptation at the wireless communication device may be subject to minimum receiver component requirements, which may be respectively specified for the different conditions. In addition, the different conditions may be associated with propagation channels received at the wireless communication device.

For example, the configuration information in at least some embodiments allows the device to freely decide on how many receiver components the device will use (e.g., activate) under a certain defined condition, as long as the device uses at least a minimum number of receiver components specified as being required under that condition. This thereby frees the device to take into account its own preferences for the number of receiver components to use.

In one or more embodiments, when implementing the method 200 of FIG. 2, the wireless communication device detects that a given one of the different possible conditions at the wireless communication device is met. The method 200 in this case may further include identifying a minimum number of receiver components that the device must use under the detected condition, e.g., by mapping the detected condition to a respective minimum number specified in a look-up table at the device or by obtaining the minimum number from the received configuration information. The wireless communication device also evaluates one or more conditions to identify a device-preferred number of receiver components to use. These conditions may include the one or more conditions as described above in relation to method 100 of FIG. 1. For example, these one or more conditions may pertain to battery conservation concerns and/or performance concerns at the device.

Alternatively or additionally, in some embodiments, the conditions may be associated with correlation of propagation channels received at the wireless communication device of a wireless communication device. Accordingly, in some embodiments, the different conditions may be associated with different degrees of correlation between different propagation channels received at the wireless communication device. Furthermore, these different degrees of correlation may be defined by one or more correlation thresholds, which may be preconfigured or indicated by the configuration information.

The method 200 also includes, at block 204, autonomously adapting the number of receiver components that the device uses in accordance with the configuration information. Specifically, in some examples, subject to the wireless communication device using at least the minimum number of receiver components, the device may adjust/adapt the number of receiver components that the device uses towards the device-preferred number (e.g., by as much as possible given the minimum receiver component requirement) according to the conditions.

FIG. 3 illustrates additional details of a wireless communication device 300 according to one or more embodiments. For purposes of the present disclosure, the wireless communication device 300 may be referred to simply as "the device." The device 300 is configured, e.g., via functional means or units, to implement the processing of method 200 in FIG. 2.

The device 300, in some embodiments, includes a receiving unit 302 or means for receiving the configuration information from the network node. The device 300 in this case further includes an adapting unit 302 or means for autonomously adapting the number of receiver components that the device 300 uses in accordance with the configuration information.

In at least some embodiments, the device 300 may include one or more processing circuits 306 configured to implement the above processing, such as by implementing functional means or units. In one embodiment, for example, the processing circuit(s) 306 implement functional means or units as respective circuits. The circuits in this regard may comprise circuits dedicated to performing certain functional processing and/or one or more microprocessors in conjunction with memory 308. In embodiments that employ memory 308, which may comprise one or several types of memory such as read-only memory (ROM), random-access memory, cache memory, flash memory devices, optical storage devices, etc., the memory 308 stores program code that, when executed by the one or more for carrying out one or more microprocessors, carries out the techniques described herein.

In one or more embodiments, the device 300 also comprises one or more communication interfaces 310. The one or more communication interfaces 310 include various components (not shown) for sending and receiving data and control signals. More particularly, the communication interface(s) 310 include one or more transmitters that are each configured to use known signal processing techniques, typically according to one or more standards, and is configured to condition a signal for transmission (e.g., over the air via one or more antennas 312). Similarly, the communication interface(s) 310 include one or more receivers that are each configured to convert signals received (e.g., via the antenna(s) 312) into digital samples for processing by the one or more processing circuits.

Figure 4:
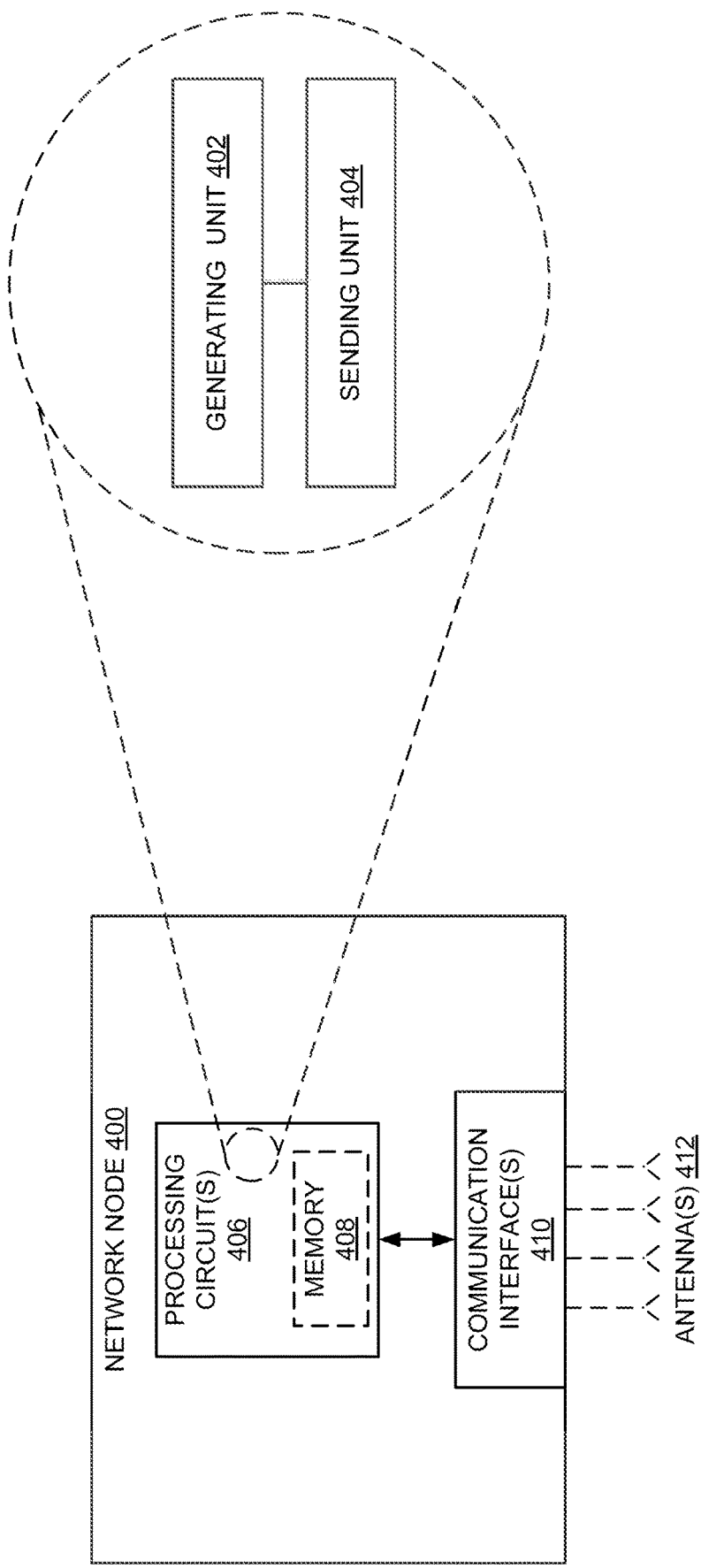
FIG. 4 illustrates details of an example network node according to one or more embodiments.

FIG. 4 illustrates additional details of the network node 400 according to one or more embodiments. The network node 400 is configured, e.g., via functional means or units, to implement the processing of method 100 in FIG. 1. The network node 400, in some embodiments, includes a generating unit 402 or means for generating the configuration information. The network node 400 in this case further includes a sending unit 404 or means for sending the configuration information to the device.

In at least some embodiments, the network node 400 comprises one or more processing circuits 406 configured to implement the above processing, such as by implementing functional means or units. In one embodiment, for example, the processing circuit(s) 406 implement functional means or units as respective circuits. The circuits in this regard may comprise circuits dedicated to performing certain functional processing and/or one or more microprocessors in conjunction with memory 408. In embodiments that employ memory 408, which may comprise one or several types of memory such as read-only memory (ROM), random-access memory, cache memory, flash memory devices, optical storage devices, etc., the memory 408 stores program code that, when executed by the one or more for carrying out one or more microprocessors, carries out the techniques described herein.

In one or more embodiments, the network node 400 also comprises one or more communication interfaces. The one or more communication interfaces include various components (not shown) for sending and receiving data and control signals. More particularly, the interface(s) include a transmitter that is configured to use known signal processing techniques, typically according to one or more standards, and is configured to condition a signal for transmission (e.g., over the air via one or more antennas). Similarly, the interface(s) include a receiver that is configured to convert signals received (e.g., via the antenna(s)) into digital samples for processing by the one or more processing circuits 406.

Those skilled in the art will also appreciate that embodiments herein further include corresponding computer programs. A computer program comprises instructions which, when executed on at least one processor of the network node or the wireless communication device, cause node or device to carry out any of the respective processing described above. Embodiments further include a carrier containing such a computer program. This carrier may comprise one of an electronic signal, optical signal, radio signal, or computer readable storage medium. A computer program in this regard may comprise one or more code modules corresponding to the means or units described above.

Additional embodiments will now be described in certain contexts. In some embodiments a more general term "network node" (e.g. the network node 400 of FIG. 4) is used and it can correspond to any type of radio network node or any network node, which communicates with a UE and/or with another network node. Examples of network nodes are base station, Node B, MeNB, SeNB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME etc.), O&M, OSS, SON, positioning node (e.g. E-SMLC), MDT etc.

In some embodiments the non-limiting term user equipment (UE) is used and it refers to any type of wireless device communicating with a network node and/or with another UE in a cellular or mobile communication system. In some examples, the wireless communication device referred to and/or described herein (e.g. the wireless communication device 300 of FIG. 3) may be a UE. In an aspect, such a UE may be a target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc.

The embodiments are described for single carrier operation of the UE i.e. for adapting UE receivers for receiving on the PCell. However the embodiments are also applicable to two or more carriers used by the UE when operating in carrier aggregation (CA). In CA the same or different mechanisms or principles may be applied for adapting UE receivers for receiving radio signals on different serving cells (e.g. PCell, SCell, PSCell etc.).

Even though embodiments herein are not limited by the particular number of receiver components that the device has or is capable of using, it is assumed in at least some embodiments herein that the UE has four receivers (aka receive antennas or four-way receive diversity). The UE uses these receivers for receiving signals from a cell e.g. for doing measurements, for receiving data and/or control channels etc.

For example, the UE uses one or more receivers for receiving data channels (e.g. PDSCH), control channels (e.g. PDCCH, E-PDCCH, PHICH, PCFICH etc.), broadcast channel (e.g. PBCH), MBMS related data channel such as MCH, MBMS related control channel such as MCCH, etc., from one or more cells.

The UE also uses one or more receivers for performing one or more radio measurements on serving and one or more neighbor cells. The cells may belong to the serving or non-serving carriers. Examples of measurements are cell detection (aka cell search), acquisition of cell global ID (CGI) of a cell, RSRP, RSRQ, path loss etc. The UE has to first detect a cell and therefore cell identification e.g. acquisition of a physical cell identity (PCI), is also a signal measurement. The UE may also have to acquire the cell global ID (CGI) of a cell.

The UE may also use one or more receivers for performing one or more procedures related to the monitoring of the serving cell quality. Example of such procedure is a radio link monitoring which comprises of out of sync detection, in sync detection, radio link failure etc.

In one or more embodiments where a UE has four receivers, the UE shall only be required to use four receivers when the network node has configured the UE that is has to use four active receivers. The underlying rationale in this case is that the network node has all information to judge when there is a substantial gain from the extra receivers.

In idle mode the number of receivers used for receive diversity by the UE for receiving radio signals from one or more cells can be decided by the UE based on thresholds provided by the network node. These thresholds may be related to one or more of the radio environment or radio propagation condition (fading increases the gain in throughput from the different antennas), the signal quality of the serving cell (with bad quality the need to find alternative cells is higher), and the number of already detected cells (with several already detected cells the need of finding more cells is lower).

In connected mode, the number of receivers used for receive diversity by the UE for receiving radio signals from one or more cells can be decided based on the configuration from the network node. The network node (e.g. serving base-station) can use this feature in the UE by configuring four receivers when it is known to be advantageous for the network that the UE uses four receivers or antennas. The configuration can be done by configuring the UE to use four receivers or not or alternatively that the network node is setting criteria for the cases when it is allowed to fallback to two receivers The four-receiver-capable UE may in the second case therefore decide the number of receivers to be used based on criteria received from the network node and the environment (fading increase the gain in throughput from the different antennas), from the quality of the serving cell (with bad quality the need to find alternative cells is higher), and from the number of already detected cells (with several already detected cells the need of finding more cells is lower).

Indeed, some embodiments herein assume that the UE can make a good judgment whether all receivers in the terminal is needed. The judgment can be based on the needed performance of mobility, possible improvements of DL throughput, the importance of power consumption etc. When the terminal is charging and the battery is reasonable full the terminal may always use four receiver antennas but without any charging and the battery is not very full the UE may use two receivers in order to save current.

The usage of many receivers in the UE improves the capacity in the system since it can be used for receiver diversity to decrease the amount of fading or it can be used for receiving several data streams in a MIMO system. The network wants the UE to use four receivers since it improves the capacity in the cell. The terminal benefits from using four receivers when the download can be made quicker and thereby power can be saved by the four receivers.

On the other hand when the allocation of data to the terminal is low, the disadvantage of the power consumption for the UE using four receivers can be argued to be higher than the advantage of capacity in the system. Therefore the UE can be allowed to use two (or three) receiver components in these lower-throughput use cases and thereby save power.

For example, with music streaming the traffic consists of data bursts with that are received and the UE is in DRX between these data bursts. With four receivers, the data bursts will be shorter since the throughput is higher and the duty cycle when the UE is not in DRX becomes lower, thereby the total power consumption will be improved Two embodiments will now be described, including (1) a method in a UE of scenario based adaptation of receivers with network assistance; and (2) a method in a UE of signaling information about adaptation of receivers to a network node.

In the first embodiment above, the UE adapt its receivers based on one or more scenarios or conditions. In this embodiment a network node configures the UE whether the UE is allowed to adapt its receivers when operating in on one or more scenarios, e.g., illustrated in Table 1. It is proposed that the UE may control or adapt the number receivers that are needed for receiving signals, for example based on one or more of the following scenarios or triggering conditions:

TABLE 1

Example Configuration Information

| Scenario ID | Scenario/Aspects | Selection of two or four receivers | Minimum Rate of selection |
|---|---|---|---|
| 0 | Terminal is charging | No issue with the power consumption, the terminal can use at least four receivers | Low rate, does not change often. |
| 1 | Terminal becomes hot due to internal heating | Needed to decrease the internal power consumption, use less than four receivers e.g. two receivers (or one receiver). | Low rate, the temperature change is slow |
| 2 | Bad coverage e.g. signal strength below threshold | Improve coverage with at least four receivers | Low rate, coverage does not change quickly |
| 3 | High mobility scenario such as high speed trains | Need to find cells for mobility early since the handover delay needs to be shortened. Use at least four receivers | Low rate, the scenario changes slowly |
| 4 | Transmission Mode | When the UE Capability and configured transmission mode require the UE to use at least four receivers, then at least four receivers must be used. | Anytime the UE get a new configuration |

TABLE 1-continued

Example Configuration Information

| Scenario ID | Scenario/Aspects | Selection of two or four receivers | Minimum Rate of selection |
|---|---|---|---|
| 5 | High data rate required in the DL | Use at least four receivers to enable as high throughput as possible | High rate, the DL scheduling changes quickly. The change to at least four receivers needs to be performed quickly while the change back to two or one receivers may be slower |
| 6 | Large DRX cycle ongoing e.g. 320 ms or above | Use less than four receivers e.g. two receivers (or one receiver) to save power | High, if UE starts to be scheduled such that the DRX inactivity timer does not expire, it may be necessary to use at least four receivers. The change back to two receivers or one receiver when the UE large DRX cycle becomes active may be slower. |
| 7 | Propagation condition or radio environment | Is the environment where four or more receivers are much better than two receivers, four or more receivers should be used, otherwise not | Low rate, propagation conditions changes slowly |
| 8 | Antennas shadowed or faded or broken/malfunction | In case one or several of the antennas have much worse environment than the other antennas, switch off these receivers. | Low rate, the shadowing or fading changes slowly. |
| 9 | UE memory usage exceeds a threshold | The UE may share the same memory or buffers for different features. The UE may use less than four antennas in case the currently used memory is above a threshold. Otherwise it may use four or more receivers. | Low rate |
| 10 | UE processor usage exceed a threshold | The UE may share the same processors or processing units for different features. The UE may use less than four antennas in case the current usage of processors is above a threshold. Otherwise it may use four or more receivers. | Low rate |
| 11 | Radio link monitoring performance | If the UE detects that the signal quality is close to out of synchronization threshold, then the UE uses four or more antennas. | |

By default the UE is expected to use all its receivers. However if explicitly allowed by the network node, then the UE may use for example fewer receivers when the UE is in any one of the scenarios. The scenarios may typically be pre-defined scenarios, e.g., configured in advance at the UE. Some of the parameters associated with the scenarios (e.g. signal quality threshold, internal temperature threshold, velocity of the UE etc.,) may be pre-defined or configured by the network node or selected by the UE autonomously (i.e. UE implementation specific).

The network node may explicitly indicate under which scenarios the UE is allowed to reconfigure its receivers. The network node can for example signal a list of pre-defined identifiers of the pre-defined scenarios expressed in table 1 to the UE. The network node may configure the UE for allowing the UE to adapt its receivers with the same or different set of one or more scenarios for the UE operation in RRC idle and RRC connected states. The network node may decide when to configure the UE for allowing the UE to adapt its receivers when the corresponding condition is met i.e. same conditions as described in table 1. For example if the radio environment is very favorable then the network node configure the UE to use fewer than four receivers. As an example the radio environment may be considered favorable if the UE speed is low (e.g. Doppler frequency is less than 10 Hz) and/or multipath delay is small (e.g. less than 1 µs).

The UE, upon receiving the indication, may determine whether the UE is operating in one or more scenarios. If the UE is operating in any of these scenarios then the UE may adapt its receiver (e.g. may use four receivers for measurements when the coverage is poor; but otherwise it uses fewer than four receivers for the same measurements).

Figure 5:
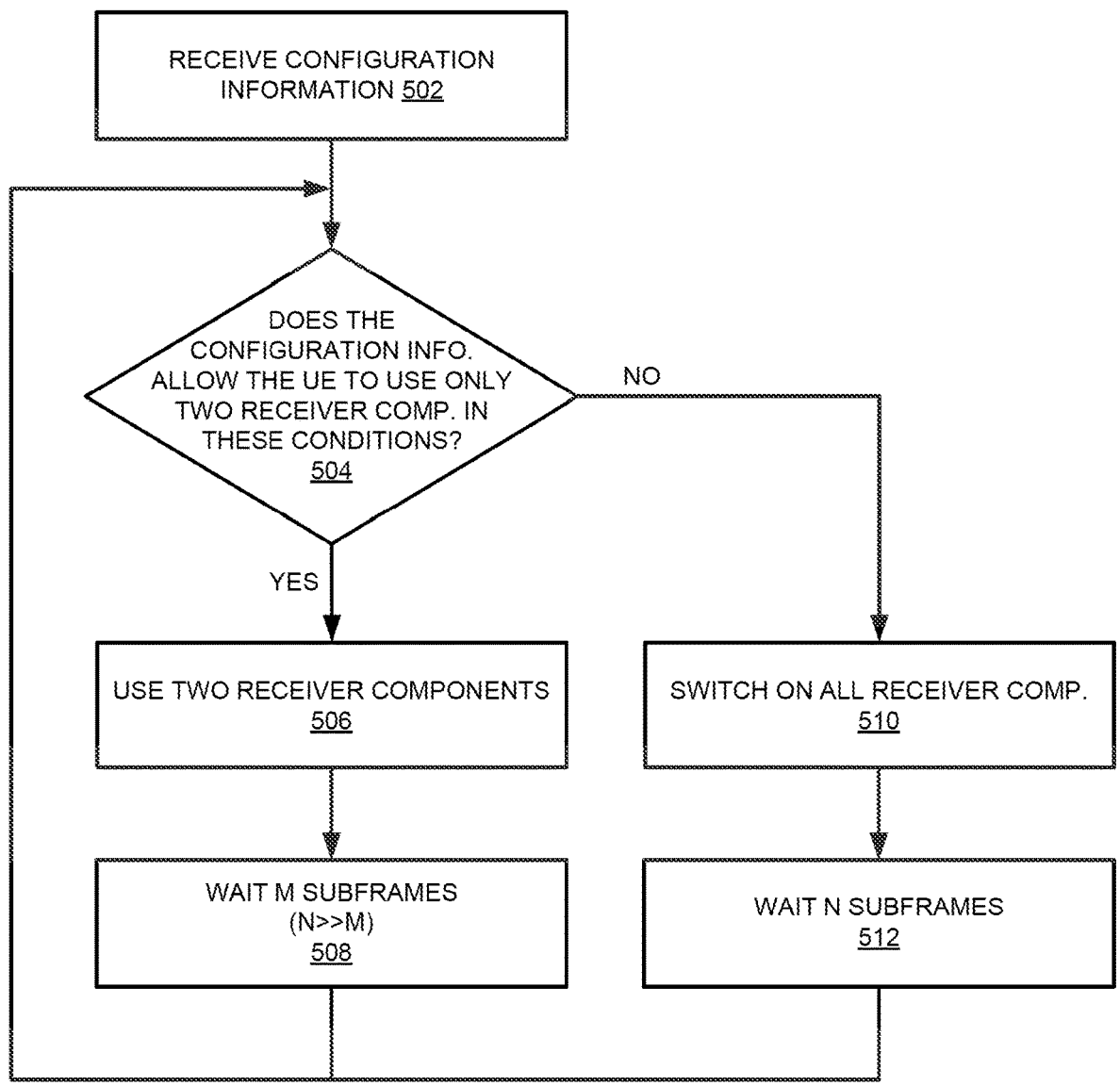
FIG. 5 illustrates a flowchart of an example method executed by a wireless communication device in connected mode.

FIG. 5 presents an example flowchart of a method 500 that may be performed for a UE in connected mode based on the aspects above. In this method 500 the aspects configured by the network node on when the UE can adapt the number of receivers used in connected mode. In some examples of the method 500, the UE checks whether two or at least four receivers are required. This control may be performed relatively often, at least when it comes to the scheduling of data to consider bursty traffic. Accordingly, the receiver component adaptation at the UE (determining the number of receiver components to use) may be performed after every scheduling (or some other interval) is received from the network.

All or some of the aspects shown in Table 1 above may be taken into account when deciding whether at least four receivers shall be used or it is feasible to use fewer receivers (e.g. one or two receivers). One reason to decrease the number of active receivers for receiving signals is for power consumption. Another reason could be to reduce the complexity or processing in the UE, as the UE may have a limited amount of processor resources. Yet another reason could be to save or conserve memory resources in the UE, as the UE may also have limited amount of memory units or resources. Some of these resources may also be used or shared between different online and offline features supported by the UE such as music, video etc. Examples of scenarios in which the UE may adapt its receivers are given in Table 1.

Note that overall and on average the terminal may decrease the total power consumption by using four or more receivers in connected mode, since it will shorten the active time to download a certain amount of data. However the peak power consumption increases when the UE actually uses four or more antennas. Similarly, by the virtue of using four or more receivers an improved cell detection performance requires that the cell detection can be carried out more sparsely (i.e. less often e.g. once every 80 ms instead of typical rate of once per 40 ms) than for a legacy (e.g., two receiver) device. Considering that cell detection in asynchronous networks requires at least 5.2 ms of radio samples to be collected, in case of short bursts of data transmitted to the user a reduction in cell detection rate reduces the radio time overhead otherwise caused when cell detection radio on-time is exceeding the PDCCH/PDSCH on-time. In asynchronous networks the transmit time difference between radio frames of any pair of cells can have any arbitrary value. In synchronous networks the magnitude of the transmit time difference between radio frames of any pair of cells is below a threshold e.g. 3 μs.

As illustrated in FIG. 5, method 500 may include receiving configuration information from a network node at block 502, as introduced above. After storing the configuration information, at block 504, the UE (e.g. wireless communication device 300) may determine whether the configuration information allows the UE to use only two receiver components in present (or recently measured) conditions (e.g. propagation channel conditions, correlation conditions, etc.). If so, the method 500 may proceed to block 506, where the UE may use two receiver components. Furthermore, the UE may wait M subframes at block 508 and may then proceed back to block 504 to again determine whether the configuration information allows to UE to use two receiver components under present (or recently measured) conditions.

Alternatively, if at block 504 the UE determines that the configuration information does not allow the UE to use only two receiver component under present (or recently measured) conditions, method 500 may proceed to block 510 and may switch on all (or more than two) receiver components. Thereafter, at block 512, the UE may wait N subframes (N, in some examples, may be larger or much larger than M of block 508), and may then proceed back to block 504 to again determine whether the configuration information allows to UE to use two receiver components under present (or recently measured) conditions.

In case the UE is stationary, even if the data reception (e.g. PDSCH reception) from the serving cell requires the UE to use four or more receivers for satisfactory performance (according to aspects above) this might not be the case for cell detection and measurements. If configures the UE to use two receivers for cell detection and measurements in this scenario and the UE only need to conduct measurements to detect when the scenario changes. For this case two receivers may suffice, hence any additional radio on-time for cell detection (extending beyond the radio time needed for data reception) can be based on only two receivers.

Figure 6:
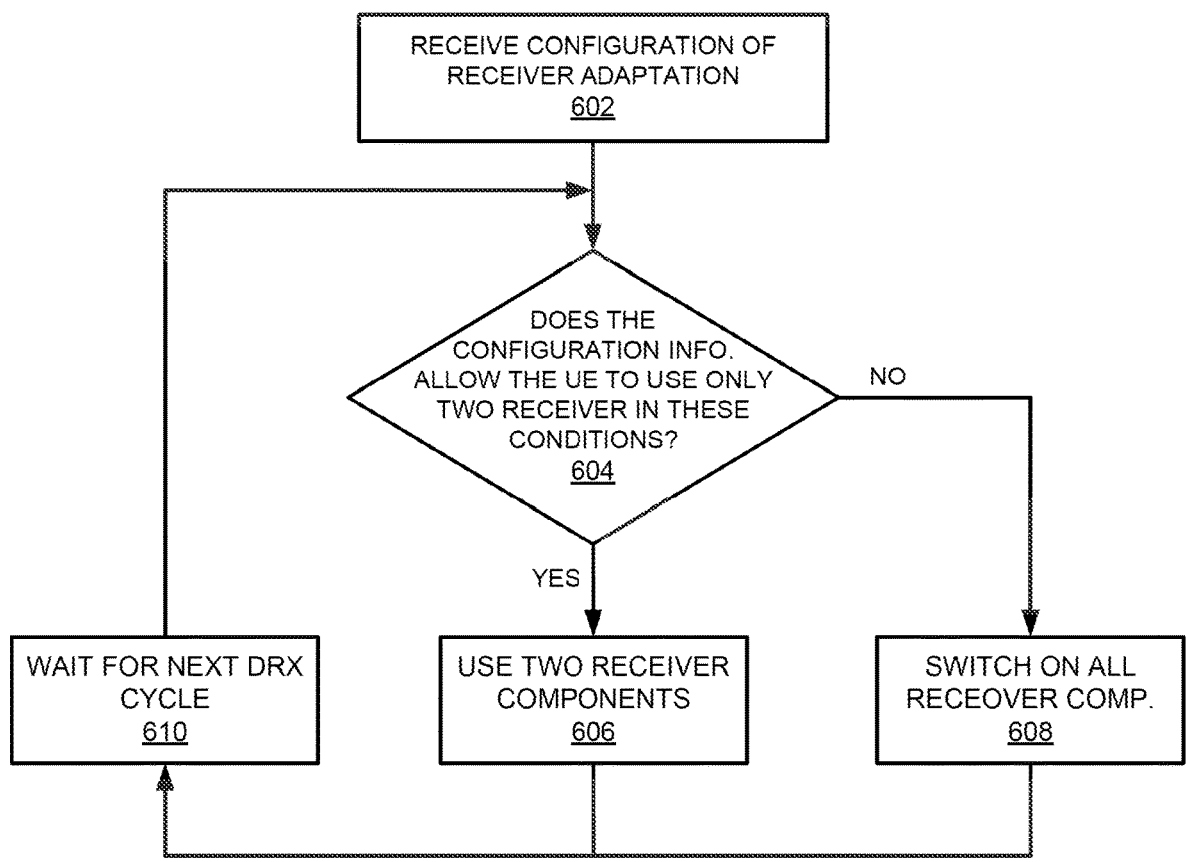
FIG. 6 illustrates a flowchart of an example method executed by a wireless communication device in idle mode.

FIG. 6 presents a method 600 that may be executed in a UE in idle mode. Like method 500, method 600 may include receiving configuration information from a network node at block 602. After storing the configuration information, at block 604, the UE (e.g. wireless communication device 300) may determine whether the configuration information allows the UE to use only two receiver components in present (or recently measured) conditions (e.g. propagation channel conditions, correlation conditions, etc.). In an aspect of the method 600 performed by the UE in idle mode, the present conditions measured by the UE may include reception performance conditions of a paging indication (e.g. whether its value is above a threshold). As illustrated in FIG. 6, method 600 illustrates a similar control loop as that of method 500 of FIG. 5, but may also take the requirements from mobility and/or coverage point of view into account at block 604.

Accordingly, at block 604, the UE may check or evaluate one or more factors, compare them with the configuration from the network node, and adapt receivers based on the evaluation. In some examples, the factors may include the quality of the measurements (e.g. whether RSRP and/or RSRQ measured from a cell, such as serving and/or neighbor cells, are above their respective thresholds). In an aspect of method 600, the UE may proceed to block 608 activate four or more receivers for performing measurements if the performed one or more measurements are below their thresholds. Another potential factor may include whether it is a high mobility scenario such as HST (e.g. speed is above a threshold). Under high mobility scenario the UE may use four or more receivers to ensure it can detect and measure more cells. A further potential factor may be whether the decoding performance of the paging indication is bad. The paging indication is received via a control channel (e.g. PDCCH) and the corresponding paging message is received via PDSCH. If the reception quality (e.g. SNR) of the paging is below a threshold then the UE may apply four or more receivers for receiving paging. Moreover, the factors may include whether the UE is able to correctly receive broadcast channels (e.g. PBCH, SIBs on PDSCH etc) by combining not more than N (e.g. N=3) retransmissions or redundancy versions. If the UE cannot correctly decode broadcast channels then the UE may start using four or more receivers for receiving them.

In an aspect, according to one or more of these factors, the method 500 may proceed to block 608 where it is determined at block 604 that the configuration information allows the UE to use more than two receiver components. At block 608, the UE may switch on all (or greater than two, such as four) receiver components, may wait until a next DRX cycle (or some other period of time) at block 610, and may then return to block 604 to determine whether the configuration information allows the UE to use only two receiver components in present (or recently measured) conditions. Alternatively, according to one or more of the above factors, the method 500 may proceed from block 604 to block 606 where it is determined at block 604 that the configuration information allows the UE to use only two receiver components. At block 606, the UE may switch on two (or one, in some examples) receiver components, may wait until a next DRX cycle (or some other period of time) at block 610, and may then return to block 604 to determine whether the configuration information allows the UE to use only two receiver components in present (or recently measured) conditions.

In some examples, when the UE uses two receivers (e.g. according to block 606), the UE must trigger a change to four or more receivers as fast as possible after the configuration indicates a need for four receivers in order to have the needed performance. On the other hand when the UE uses four or more receivers (e.g. according to block 608) and the configuration indicates that it is allowed to use two receiver components, the UE may wait some time before it decreases the number of receivers.

Additionally, although not specifically shown in FIG. 5 or 6, the present disclosure also includes a method performed by a UE for signaling information about adaptation of receivers to a network node. In an example of such an embodiment, the UE may store information about its receiver adaptation configuration in different scenarios in its memory. The UE may apply receiver adaptation autonomously or under the control of network node as described above. The UE may also report or signal the stored information to a network node. The reporting can be done on periodic or event triggered basis or even as part of statistics related to minimization of drive test (MDT). The network node receiving this information may use this for one or more tasks or operations such as for tuning of parameters in network nodes, for network planning, for modifying coverage of cells etc.

Figure 7:
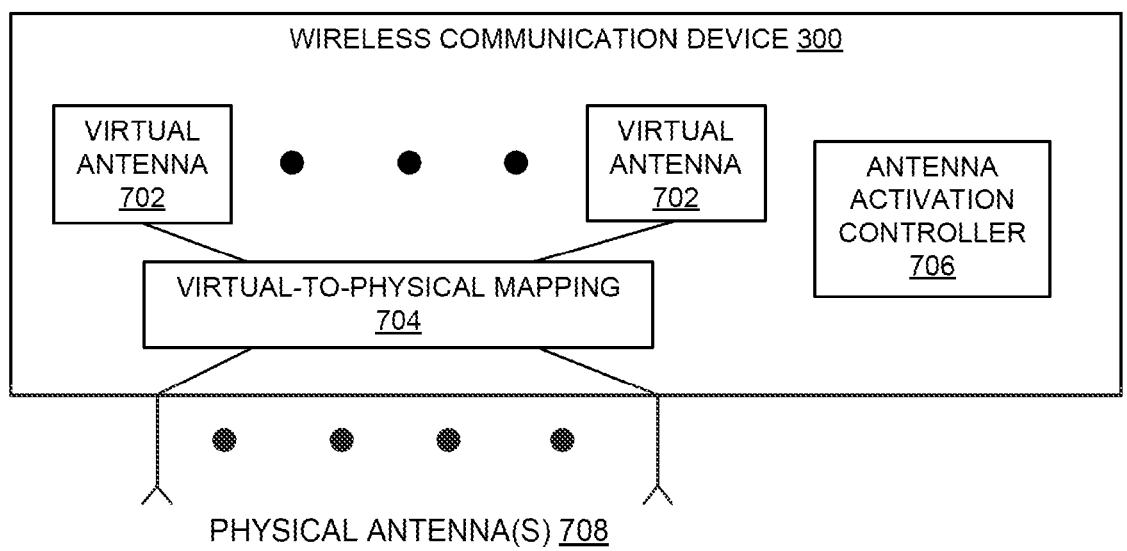
FIG. 7 illustrates details of an example wireless communication device implementing one or more virtual antennas according to one or more embodiments.

In accordance with some example embodiments, receiver components or antennas as recited in the present disclosure may refer to physical antennas or virtual antennas at the wireless communication device 300. As shown in the example wireless communication device 300 of FIG. 7, virtual antennas 702 (also known as logical antenna ports, APs) are antennas as seen from the perspective of the device's transmitter, so as to insulate the transmitter from details about the device's physical antennas 708. Although in some embodiments virtual antennas 702 directly correspond to respective physical antennas 708, virtual antennas 702 in other embodiments do not necessarily correspond to physical antennas 708. Thus, in some examples, the device 300 may be configured to map virtual antennas 702 to physical antennas 708 according to a predefined or dynamic virtual-to-physical mapping 704, as shown in FIG. 7. The device 300, in some embodiments, includes an antenna activation controller 706 that is configured to selectively activate all or only a portion of the device's virtual receive antennas 702. In other embodiments, though, the antenna activation controller 706 is configured to selectively activate all or only a portion of the device's physical receive antennas 708.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method implemented by a wireless communication device for reducing power consumption, comprising:
receiving, from a network node in a wireless communication network, configuration information that configures an extent to which the wireless communication device autonomously adapts a number of different receiver components that the wireless communication device uses under different conditions at the wireless communication device, wherein each of the different conditions is associated with a different correlation of propagation channels, each propagation channel comprising a wireless communication channel between an antenna of the network node and an antenna of the wireless communication device;
correlating the propagation channels to determine the correlation of the propagation channels; and
autonomously adapting the number of different receiver components that the wireless communication device uses in accordance with the configuration information and the correlation;
wherein autonomously adapting the number of different receiver components that the wireless communication device uses further comprises:
detecting that a given one of the different conditions at the wireless communication device is met;
identifying a minimum number of receiver components that the wireless communication device must use under the detected condition;
evaluating one or more criteria to identify a wireless communication device-preferred number of receiver components to use; and
subject to the wireless communication device using at least said minimum number of receiver components, adjusting the number of different receiver components that the wireless communication device uses towards the wireless communication device-preferred number; and
wherein detecting that the given one of the different conditions at the wireless communication device is met comprises:
evaluating the correlation to calculate different degrees of correlation between the propagation channels received at the wireless communication device; and
comparing the different degrees of correlation to one or more correlation thresholds.

2. The method of claim 1, wherein the different conditions are associated with different degrees of correlation between the propagation channels.

3. The method of claim 2, wherein the different degrees of correlation are defined by one or more correlation thresholds.

4. The method of claim 1, further comprises sending feedback to the network node indicating whether one or more of the different conditions at the wireless communication device are currently met.

5. The method of claim 1, further comprising sending feedback to the network node indicating the number of different receiver components that the wireless communication device actually used under one or more of the different conditions.

6. The method of claim 1, wherein the configuration information indicates, for each of one or more different conditions at the wireless communication device, whether the wireless communication device is allowed to autonomously adapt the number of different receiver components that the wireless communication device uses under that condition.

7. The method of claim 1, wherein the configuration information specifies the minimum receiver component requirements for the different conditions.

8. The method of claim 1, wherein the configuration information indicates, for each of one or more of the different conditions, a value of each of one or more parameters that govern whether or not the condition is deemed to have been met.

9. The method of claim 1, wherein the configuration information indicates a length of a time period between which the wireless communication device is allowed or required to adapt the number of different receiver components that the wireless communication device uses.

10. A wireless communication device for reducing power consumption, comprising:
a processor and a memory, the memory containing instructions executable by the processor whereby the wireless communication device is configured to:
receive, from a network node in a wireless communication network, configuration information that configures an extent to which the wireless communication device autonomously adapts a number of different receiver components that the wireless communication device uses under different conditions at the wireless communication device;
correlate propagation channels to determine a correlation of the propagation channels, each propagation channel comprising a wireless communication channel between an antenna of the network node and an antenna of the wireless communication device; and
autonomously adapt the number of different receiver components that the wireless communication device uses in accordance with the configuration information and the correlation;
wherein to autonomously adapt the number of different receiver components that the wireless communication device uses, the wireless communication device is configured to:
detect that a given one of the different conditions at the wireless communication device is met;
identify a minimum number of receiver components that the wireless communication device must use under the detected condition;
evaluate one or more criteria to identify a wireless communication device-preferred number of receiver components to use; and
subject to the wireless communication device using at least said minimum number of receiver components, adjust the number of different receiver components that the wireless communication device uses towards the wireless communication device-preferred number; and
wherein to detect that the given one of the different conditions at the wireless communication device is met, the wireless communication device is configured to:
evaluate the correlation to calculate different degrees of correlation between the propagation channels received at the wireless communication device; and
compare the different degrees of correlation to one or more correlation thresholds.

11. The wireless communication device of claim 10, wherein the different conditions are associated with different degrees of correlation between the propagation channels.

12. The wireless communication device of claim 11, wherein the different degrees of correlation are defined by one or more correlation thresholds.

13. The wireless communication device of claim 10, wherein the wireless communication device is further configured to send feedback to the network node indicating whether one or more of the different conditions at the wireless communication device are currently met.

14. The wireless communication device of claim 10, wherein the wireless communication device is further configured to send feedback to the network node indicating the number of different receiver components that the wireless communication device actually used under one or more of the different conditions.

15. The wireless communication device of claim 10, wherein the configuration information indicates, for each of one or more different conditions at the wireless communication device, whether the wireless communication device is allowed to autonomously adapt the number of different receiver components that the wireless communication device uses under that condition.

16. The wireless communication device of claim 10, wherein the configuration information specifies the minimum receiver component requirements for the different conditions.

17. The wireless communication device of claim 10, wherein the configuration information indicates, for each of one or more of the different conditions, a value of each of one or more parameters that govern whether or not the condition is deemed to have been met.

18. The wireless communication device of claim 10, wherein the configuration information indicates a length of a time period between which the wireless communication device is allowed or required to adapt the number of different receiver components that the wireless communication device uses.

19. The wireless communication device of claim 10, wherein the wireless communication device is a user equipment (UE).

* * * * *